United States Patent
Kameda et al.

(10) Patent No.: US 9,562,588 B2
(45) Date of Patent: Feb. 7, 2017

(54) CONTROL APPARATUS FOR AUTOMATIC TRANSMISSION

(71) Applicant: HONDA MOTOR CO., LTD., Tokyo (JP)

(72) Inventors: Shintaro Kameda, Wako (JP); Eri Kubota, Wako (JP)

(73) Assignee: HONDA MOTOR CO., LTD., Tokyo (JP)

(*) Notice: Subject to any disclaimer, the term of this patent is extended or adjusted under 35 U.S.C. 154(b) by 213 days.

(21) Appl. No.: 14/229,997

(22) Filed: Mar. 31, 2014

(65) Prior Publication Data

US 2014/0302962 A1    Oct. 9, 2014

(30) Foreign Application Priority Data

Apr. 3, 2013   (JP) .................................. 2013-077461

(51) Int. Cl.
| | |
|---|---|
| *F16H 61/686* | (2006.01) |
| *F16H 3/44* | (2006.01) |
| *F16H 61/04* | (2006.01) |
| *F16H 3/66* | (2006.01) |

(52) U.S. Cl.
CPC ............ *F16H 3/44* (2013.01); *F16H 61/04* (2013.01); *F16H 3/66* (2013.01); *F16H 61/686* (2013.01); *F16H 2061/0444* (2013.01); *F16H 2200/006* (2013.01); *F16H 2200/2012* (2013.01); *F16H 2200/2048* (2013.01)

(58) Field of Classification Search
CPC .............................. F16H 61/04; F16H 61/686; F16H 2061/0444; F16H 2200/006; F16H 2200/2012; F16H 2200/2048
See application file for complete search history.

(56) References Cited

U.S. PATENT DOCUMENTS

| | | | |
|---|---|---|---|
| 5,099,718 A | 3/1992 | Asada et al. | |
| 2006/0154780 A1* | 7/2006 | Ayabe | F16H 61/061 477/79 |

FOREIGN PATENT DOCUMENTS

| | | |
|---|---|---|
| JP | 03-181670 | 8/1991 |
| JP | 2775951 B2 | 9/1991 |
| JP | 2005-273768 | 10/2005 |

OTHER PUBLICATIONS

Japanese Office Action for corresponding JP Application No. 2013-077461, Sep. 17, 2014.

* cited by examiner

*Primary Examiner* — Huan Le
(74) *Attorney, Agent, or Firm* — Mori & Ward, LLP

(57) ABSTRACT

A control apparatus for an automatic transmission includes a vehicle speed detector and a controller. The vehicle speed detector is configured to detect a vehicle speed. The controller is configured to set one of a plurality of gear change stages according to a running condition of a vehicle and configured to select one of a plurality of engagement combination states of a plurality of engagement mechanisms to achieve, according to the vehicle speed detected by the vehicle speed detector, at least one gear change stage out of the plurality of gear change stages in a case in which the controller sets the at least one gear change stage. The at least one gear change stage has the plurality of engagement combination states to achieve the at least one gear change stage.

13 Claims, 11 Drawing Sheets

FIG. 5

|      | C1 | C2  | C3  | B1 | B2 | B3 | B4 |
|------|----|-----|-----|----|----|----|----|
| Rvs  |    |     | O   |    | O  | O  |    |
| 1st  |    |     |     | O  | O  | O  |    |
| 2nd  |    | O   |     | O  |    | O  |    |
| 3rd  |    |     | O   | O  |    | O  |    |
| 4th  |    | O   | O   | O  |    |    |    |
| 5thA | O  |     | (O) | O  |    |    |    |
| 5thB | O  | (O) |     | O  |    |    |    |
| 6th  | O  | O   | O   |    |    |    |    |
| 7th  | O  |     | O   |    |    | O  |    |
| 8th  | O  | O   |     |    |    | O  |    |

FIG. 6A

| TRANSMISSION MODE | ENGAGEMENT ELEMENT FOR SHIFT | |
|---|---|---|
| 3rd ⇔ 5thA | C1(3rd) | B3(5thA) |
| 4th ⇔ 5thA | C1(4th) | C2(5thA) |
| 5thA ⇔ 6th | B1(5thA) | C2(6th) |
| 5thA ⇔ 7th | B1(5thA) | B3(7th) |

FIG. 6B

| TRANSMISSION MODE | ENGAGEMENT ELEMENT FOR SHIFT | |
|---|---|---|
| 2nd ⇔ 5thB | C2(2nd) | B3(5thB) |
| 4th ⇔ 5thB | C1(4th) | C2(5thB) |
| 5thB ⇔ 6th | B1(5thB) | C3(6th) |
| 5thB ⇔ 8th | B1(5thB) | B3(8th) |

FIG. 12

|      | C1  | C2  | C3  | B1  | B2  | B3  | B4  |
|------|-----|-----|-----|-----|-----|-----|-----|
| Rvs  |     |     | ○   |     | ○   | ○   |     |
| Low  |     |     |     | ○   | ○   | ○   |     |
| 2nd  |     | ○   |     | ○   |     | ○   |     |
| 3rd  |     |     | ○   | ○   |     | ○   |     |
| 4th  |     | ○   | ○   | ○   |     |     |     |
| 5thA | ○   |     | (○) | ○   |     |     |     |
| 5thB | ○   | (○) |     | ○   |     |     |     |
| 6th  | ○   | ○   | ○   |     |     |     |     |
| 7th  | ○   |     | ○   |     |     | ○   |     |
| 8th  | ○   | ○   |     |     |     | ○   |     |
| 9th  | ○   |     |     |     |     | ○   | ○   |
| 10th | ○   | ○   |     |     |     |     | ○   |

CONTROL APPARATUS FOR AUTOMATIC TRANSMISSION

CROSS-REFERENCE TO RELATED APPLICATIONS

The present application claims priority under 35 U.S.C. §119 to Japanese Patent Application No. 2013-077461, filed Apr. 3, 2013, entitled "Control Apparatus for Automatic Transmission." The contents of this application are incorporated herein by reference in their entirety.

BACKGROUND

1. Field

The present disclosure relates to a control apparatus for an automatic transmission.

2. Description of the Related Art

Known conventional multi-stage automatic transmissions have a planetary gear mechanism. Such an automatic transmission disclosed, for example, in Japanese Unexamined Patent Application Publication No. 2005-273768 is able to make gear change to any of eight forward gear stages by using a first planetary gear mechanism for input, second and third two planetary gear mechanisms for gear change, and six engagement mechanisms including friction clutches and brakes.

In the above-mentioned automatic transmission, increase in a rotational difference between friction members of any of the engagement mechanisms with respect to the input rotation with a predetermined gear change stage selected may cause an excessive work loss of the engagement mechanism. Consequently, reduction in the acceleration of a vehicle and/or an increase in the temperature of hydraulic oil in the automatic transmission may occur.

On the other hand, in a multi-stage automatic transmission, for the sake of improvement of the fuel efficiency and driving performance (drivability) of the vehicle, it is necessary to increase the flexibility of shifting to a gear change stage by achieving quick and smooth operation allowing not only gear change to an adjacent gear change stage, but also skip gear change with one stage or two stages skipped. For this purpose, by achieving a skip gear change using only, for example, engagement shift between two of a plurality of engagement mechanisms, quick and smooth gear change operation may be implemented and variation of shifting between gear change stages may be increased.

In Japanese Patent No. 2775951 describes a conventional technology related to the above-described rotational difference of an engagement mechanism. The automatic transmission described in Japanese Patent No. 2775951 has multiple engagement combinations in pattern as engagement combinations of engagement mechanisms for achieving a predetermined gear change stage. When gear change is made to a target gear change stage from the predetermined gear change stage for an engagement combination pattern in which a rotational difference of a rotational member increases, the engagement combination is changed to another engagement combination pattern in which a rotational difference of a rotational member decreases, and then gear change is made to the target gear change stage.

SUMMARY

According to one aspect of the present invention, a control apparatus for an automatic transmission includes a vehicle speed detector and a controller. The automatic transmission includes an input shaft, a plurality of planetary gear mechanisms, and a plurality of engagement mechanisms. A driving force generated by a drive source of a vehicle is transferred to the input shaft. The plurality of planetary gear mechanisms each include rotational elements having a sun gear, a carrier, and a ring gear. The plurality of engagement mechanisms each are configured to releasably connect two of the rotational elements of the plurality of planetary gear mechanisms or to releasably fix at least one of the rotational elements to a member on a fixed side. The automatic transmission is configured to achieve a plurality of gear change stages with different transmission gear ratios by changing an engagement combination state of the plurality of engagement mechanisms. The vehicle speed detector is configured to detect a vehicle speed. The controller is configured to set one of the plurality of gear change stages according to a running condition of the vehicle and configured to select one of a plurality of engagement combination states of the plurality of engagement mechanisms to achieve, according to the vehicle speed detected by the vehicle speed detector, at least one gear change stage out of the plurality of gear change stages in a case in which the controller sets the at least one gear change stage. The at least one gear change stage has the plurality of engagement combination states to achieve the at least one gear change stage.

According to another aspect of the present invention, a control apparatus for an automatic transmission of a vehicle includes a vehicle speed detector, a setting controller, and a selecting controller. The vehicle speed detector is configured to detect a vehicle speed. The setting controller is configured to set one of a plurality of gear change stages according to a running condition of the vehicle. The automatic transmission is configured to achieve the plurality of gear change stages with different transmission gear ratios by changing an engagement combination state of a plurality of engagement mechanisms. The plurality of engagement mechanisms each are configured to releasably connect two of rotational elements of a plurality of planetary gear mechanisms or to releasably fix at least one of the rotational elements to a member on a fixed side. Each of the plurality of planetary gear mechanisms includes rotational elements having a sun gear, a carrier, and a ring gear. The selecting controller is configured to select one of a plurality of engagement combination states of the plurality of engagement mechanisms to achieve, according to the vehicle speed detected by the vehicle speed detector, at least one gear change stage out of the plurality of gear change stages in a case in which the setting controller sets the at least one gear change stage. The at least one gear change stage has the plurality of engagement combination states to achieve the at least one gear change stage.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

FIG. 5 is a diagram illustrating the state of engagement mechanism for each of the gear change stages of the automatic transmission according to the first embodiment.

FIGS. 6A and 6B are tables illustrating shifting states of engagement mechanism in gear change from the 5th gear stage; FIG. 6A is a table illustrating shifting states of engagement mechanism of the 5th gear stage A mode; and FIG. 6B is a table illustrating shifting states of engagement mechanism of the 5th gear stage B mode.

FIG. 12 is a table illustrating the state of engagement mechanism for each of the gear change stages in the automatic transmission according to the second embodiment.

DESCRIPTION OF THE EMBODIMENTS

Figure 1:
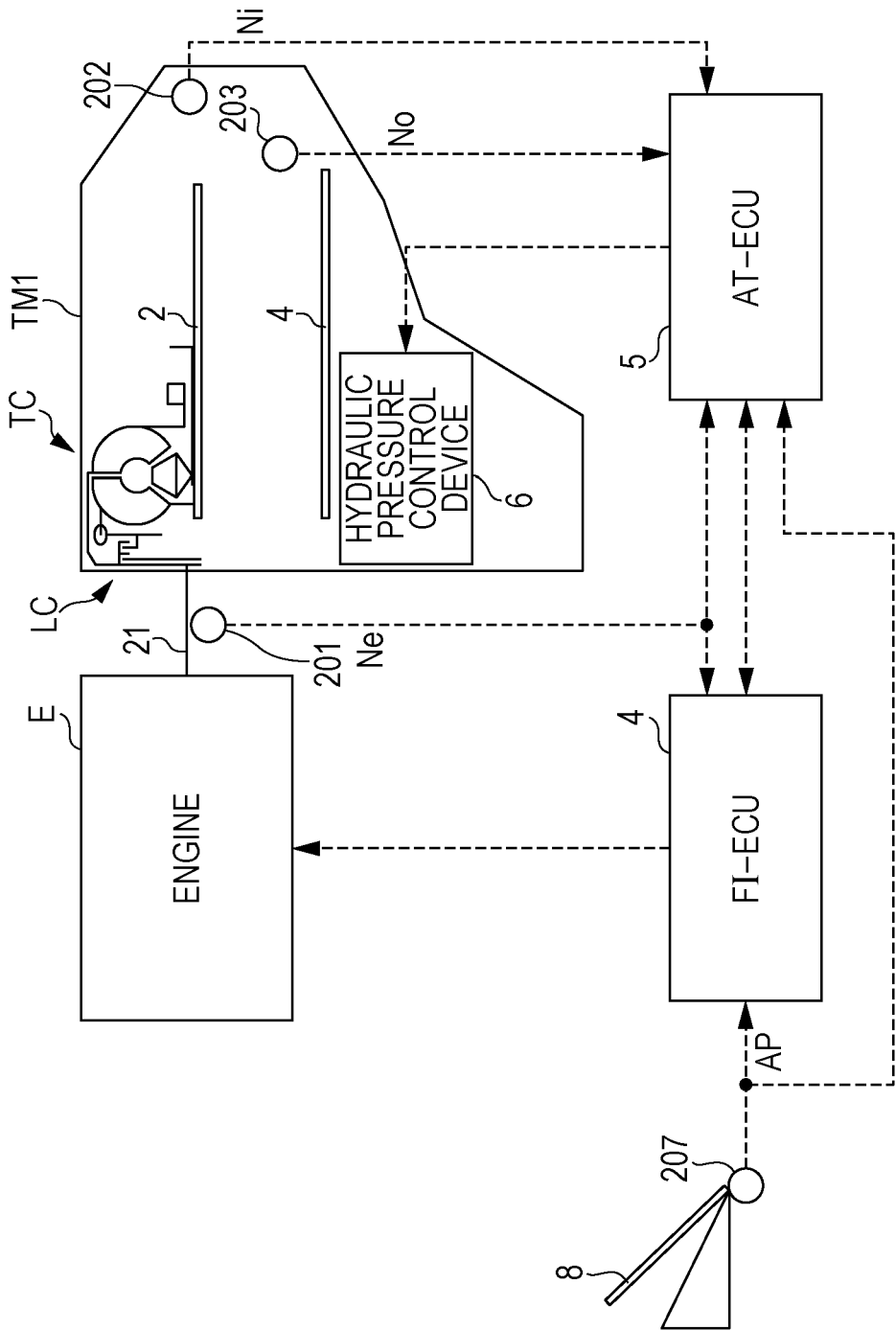
FIG. 1 is a schematic diagram of a drive system of a vehicle equipped with an automatic transmission according to an embodiment of the present disclosure.

The embodiments will now be described with reference to the accompanying drawings, wherein like reference numerals designate corresponding or identical elements throughout the various drawings.

Hereinafter, an embodiment of the present disclosure will be described in detail with reference to the accompanying drawings.

First Embodiment

FIG. 1 is a schematic diagram of a drive system of a vehicle equipped with an automatic transmission according to an embodiment of the present disclosure. As illustrated in FIG. 1, the vehicle of the present embodiment includes an internal combustion engine (engine) E which is a drive source, an automatic transmission TM1 connected to the engine E via a hydraulic torque converter TC, a fuel injection control unit (FI-ECU) 4 to control the engine E electronically, an automatic transmission control unit (AT-ECU) 5 (control unit 5) to electronically control the automatic transmission TM1 including the torque converter TC, and a hydraulic pressure control device 6 to control rotational drive and lock-up of the torque converter TC and joint (engagement)/release of a plurality of friction engagement mechanisms included in the automatic transmission TM1 according to the control of the AT-ECU 5.

The rotational output of the engine E is outputted to a crankshaft (output shaft of the engine E) 21, and transmitted to an input shaft 2 of the automatic transmission TM1 via the torque converter TC. The torque converter TC is provided with a lock-up clutch LC. The lock-up clutch LC sets lock-up ON or OFF state according to the lock-up control by the AT-ECU 5.

A crankshaft rotational speed sensor 201 for detecting a rotational speed Ne of the crankshaft 21 (engine E) is provided in the vicinity of the crankshaft 21. An input shaft rotational speed sensor 202 for detecting a rotational speed (rotational speed of the input shaft of the automatic transmission TM1) Ni of the input shaft 2 is provided in the vicinity of the input shaft 2. An output shaft rotational speed sensor 203 for detecting a rotational speed (rotational speed of the output shaft of the automatic transmission TM1) No of an output shaft 4 is provided in the vicinity of the output shaft 4. The rotational speed data Ne, Ni, No detected by the respective sensors 201 to 203 and vehicle speed data calculated based on No are supplied to the AT-ECU 5. The engine rotational speed data Ne is supplied to the FI-ECU 4. An accelerator pedal opening sensor 207 for detecting opening (accelerator pedal opening) APAT of an accelerator pedal 8 is provided in the vicinity of the accelerator pedal 8, the accelerator pedal opening sensor 207 being connected to the accelerator pedal 8 via a wire or the like which is not illustrated. Accelerator pedal opening data detected by the accelerator pedal opening sensor 207 is outputted to the FI-ECU 4 and the AT-ECU 5.

Figure 2:
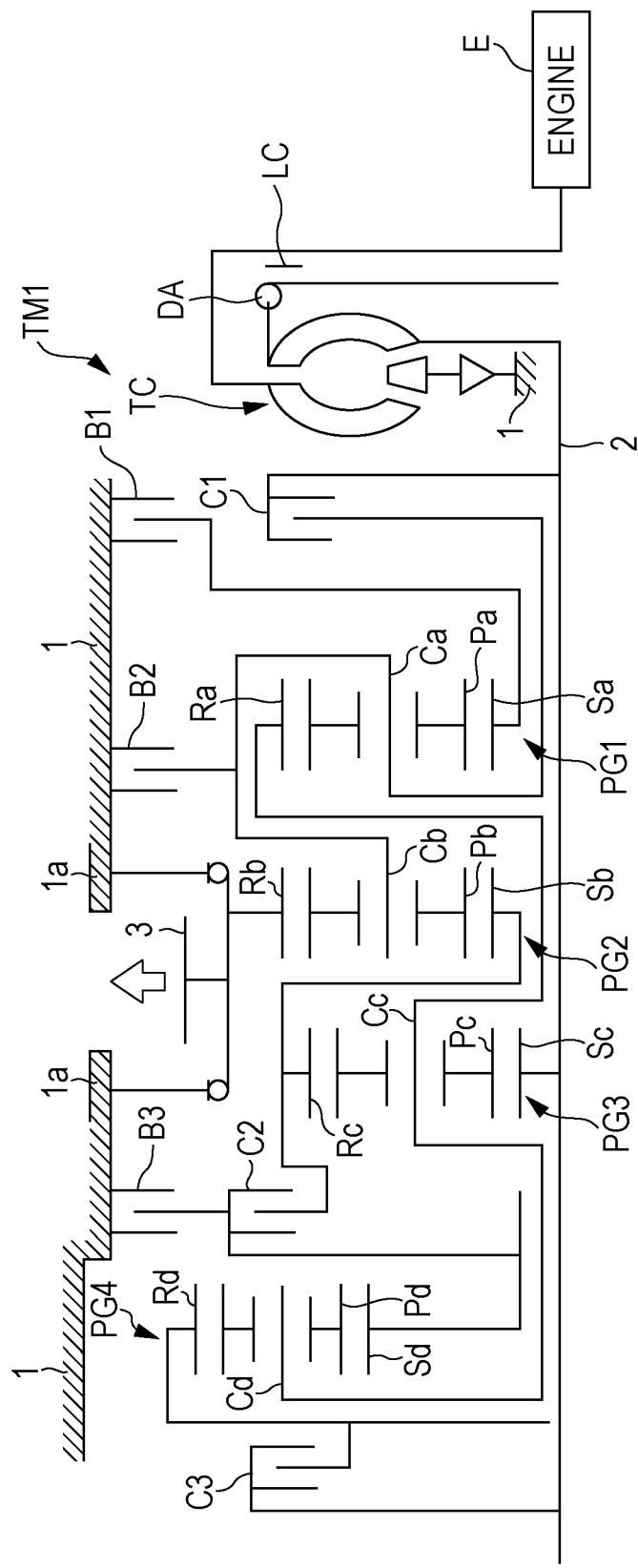
FIG. 2 is a skeleton diagram illustrating an automatic transmission according to a first embodiment of the present disclosure.
Figure 3:
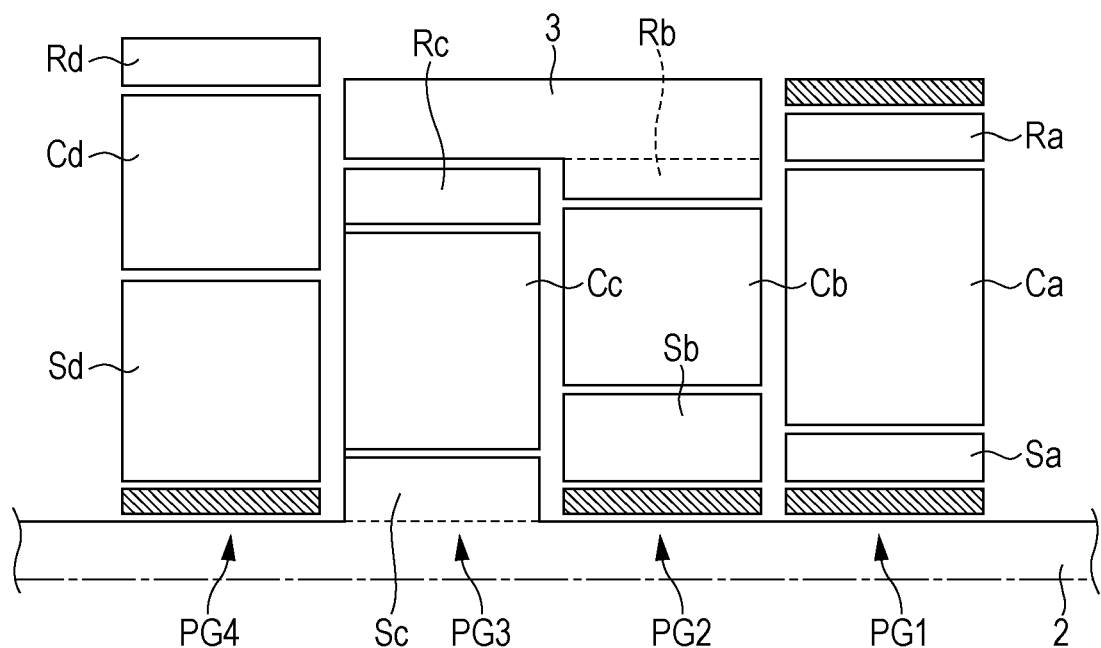
FIG. 3 is a schematic diagram illustrating the arrangement of the components of first to fourth planetary gear mechanisms included in the automatic transmission.
Figure 4:
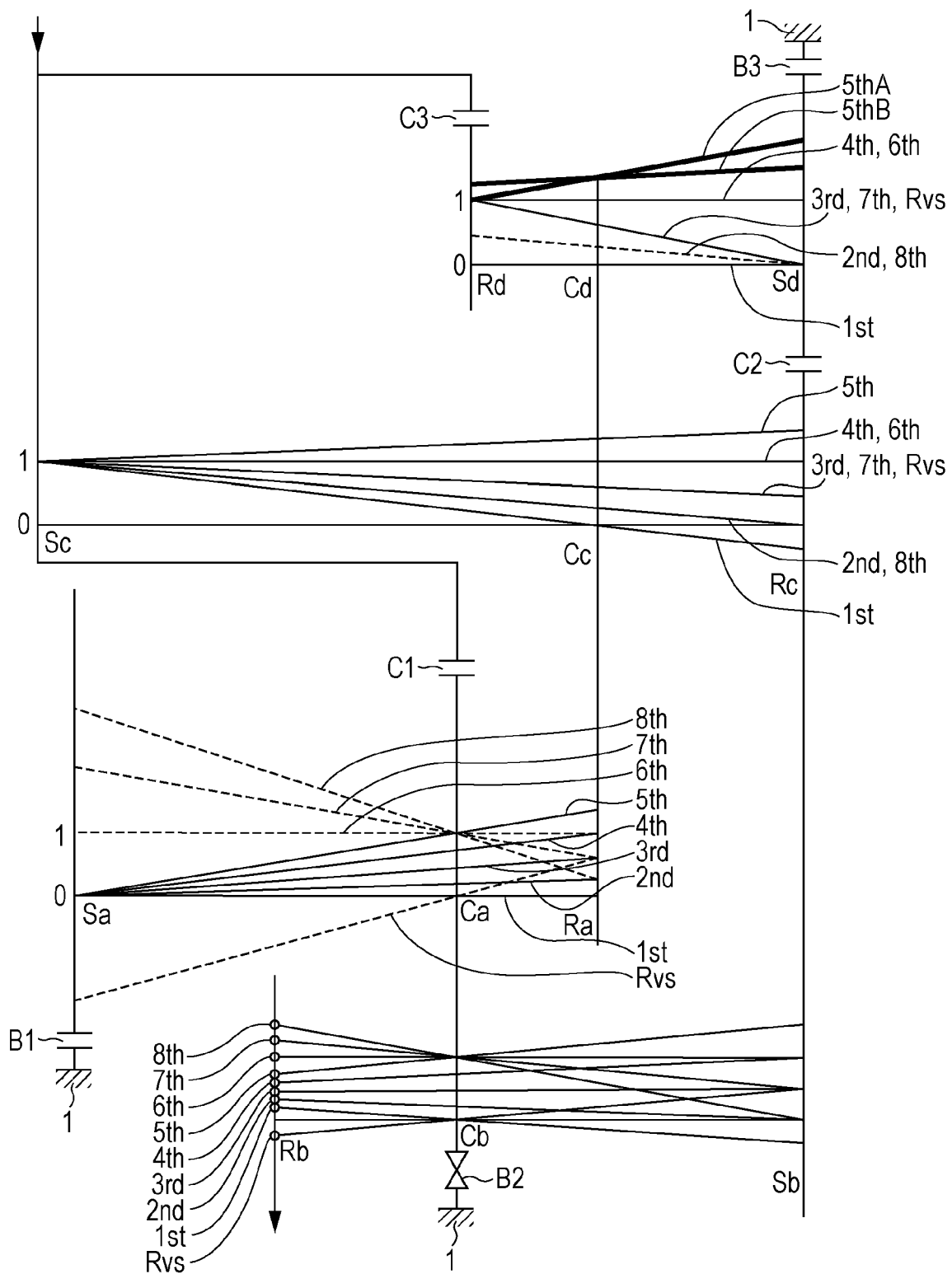
FIG. 4 is a nomogram illustrating ratios between relative speeds of the components of the first to fourth planetary gear mechanisms included in the automatic transmission according to the first embodiment.

FIG. 2 is a skeleton diagram illustrating the automatic transmission TM1 according to the first embodiment of the present disclosure. FIG. 3 is a schematic diagram illustrating the arrangement of the components of first to fourth planetary gear mechanisms included in the automatic transmission TM1. FIG. 4 is a nomogram illustrating ratios between relative speeds of the components of the first to fourth planetary gear mechanisms included in the automatic transmission TM1. As illustrated in FIG. 1, the automatic transmission TM1 according to the first embodiment includes the input shaft 2 rotatably supported in a transmission case 1, and an output gear 3 which is an output member disposed coaxially with the input shaft 2. The driving force outputted by the engine E being a drive source is transmitted to the input shaft 2 via the torque converter TC having the lock-up clutch LC and a damper DA.

The rotation of the output gear 3 is outputted to the output shaft 4 illustrated in FIG. 1 and is transmitted from the output shaft 4 to the right and left driving wheels of the vehicle via a differential gear or propeller shaft (not illustrated). Instead of the torque converter TC, a single plate type or multi-plate type start clutch may be provided which allows variable frictional engagement.

In the transmission case 1, the first to fourth planetary gear mechanisms PG 1 to 4 are disposed coaxially with the input shaft 2. The first planetary gear mechanism PG1 is so-called a single pinion type planetary gear mechanism including a sun gear Sa, a ring gear Ra, and a carrier Ca which pivotally supports a pinion Pa engaged with the sun gear Sa and the ring gear Ra in a rotatable and revolvable manner. In the first planetary gear mechanism PG1, when the sun gear Sa is rotated with the carrier Ca fixed, the ring gear Ra rotates in the opposite direction to the sun gear Sa. When the sun gear Sa is rotated with the ring gear Ra fixed, the carrier Ca rotates in the same direction as the sun gear Sa.

Referring to the nomogram (diagram capable of illustrating a ratio between the relative rotational speeds of three elements of the sun gear Sa, the carrier Ca, and the ring gear Ra by a straight line (speed line)) of the first planetary gear mechanism PG1 illustrated in the third part from the top of FIG. 4, the three elements Sa, Ca, Ra of the first planetary gear mechanism PG1 are referred to as the 1st element, the 2nd element, and the 3rd element, respectively, in the order from the left in a space interval corresponding to the gear ratio (the number of teeth of the ring gear/the number of teeth of the sun gear) in the nomogram. That is, the 1st element is the sun gear Sa, the 2nd element is the carrier Ca, and the 3rd element is the ring gear Ra. The ratio of the space interval between the sun gear Sa and the carrier Ca with respect to the space interval between the carrier Ca and the ring gear Ra is set to h:1, where h is the gear ratio of the first planetary gear mechanism PG1.

The second planetary gear mechanism PG2 is also so-called a single pinion type planetary gear mechanism including a sun gear Sb, a ring gear Rb, and a carrier Cb which pivotally supports a pinion Pb engaged with the sun gear Sb and the ring gear Rb in a rotatable and revolvable manner.

Referring to the nomogram of the second planetary gear mechanism PG2 illustrated in the fourth part (the lowermost part) from the top of FIG. 4, three elements Sb, Cb, Rb of the second planetary gear mechanism PG2 are referred to as the 4th element, the 5th element, and the 6th element, respectively, in the order from the left in a space interval corresponding to the gear ratio in the nomogram. That is, the 4th element is the ring gear Rb, the 5th element is the carrier Cb, and the 6th element is the sun gear Sb. The ratio of the space interval between the sun gear Sb and the carrier Cb with respect to the space interval between the carrier Cb and the ring gear Rb is set to i:1, where i is the gear ratio of the second planetary gear mechanism PG2.

The third planetary gear mechanism PG3 is also so-called a single pinion type planetary gear mechanism including a sun gear Sc, a ring gear Rc, and a carrier Cc which pivotally supports a pinion Pc engaged with the sun gear Sc and the ring gear Rc in a rotatable and revolvable manner.

Referring to the nomogram of the third planetary gear mechanism PG3 illustrated in the second part from the top of FIG. 4, three elements Sc, Cc, Rc of the third planetary gear mechanism PG3 are referred to as the 7th element, the 8th element, and the 9th element, respectively, in the order from the left in a space interval corresponding to the gear ratio in the nomogram. That is, the 7th element is the sun gear Sc, the 8th element is the carrier Cc, and the 9th element is the ring gear Rc.

Here, the ratio of the space interval between the sun gear Sc and the carrier Cc with respect to the space interval between the carrier Cc and the ring gear Rc is set to j:1, where j is the gear ratio of the third planetary gear mechanism PG3. It is to be noted that in the nomogram, the lower horizontal line and the upper horizontal line (the line overlapping with the 4th and 6th lines) indicate rotational speeds of "0" and "1" (the same rotational speed as the input shaft 2), respectively.

The fourth planetary gear mechanism PG4 is also so-called a single pinion type planetary gear mechanism including a sun gear Sd, a ring gear Rd, and a carrier Cd which pivotally supports a pinion Pd engaged with the sun gear Sd and the ring gear Rd in a rotatable and revolvable manner.

Referring to the nomogram of the fourth planetary gear mechanism PG4 illustrated in the first part (the uppermost part) from the top of FIG. 4, three elements Sd, Cd, Rd of the fourth planetary gear mechanism PG4 are referred to as the 10th element, the 11th element, and the 12th element, respectively, in the order from the left in a space interval corresponding to the gear ratio in the nomogram. That is, the 10th element is the ring gear Rd, the 11th element is the carrier Cd, and the 12th element is the sun gear Sd. The ratio of the space interval between the sun gear Sd and the carrier Cd with respect to the space interval between the carrier Cd and the ring gear Rd is set to k:1, where k is the gear ratio of the fourth planetary gear mechanism PG4.

The sun gear Sc (the 7th element) of the third planetary gear mechanism PG3 is connected to the input shaft 2. The ring gear Rb (the 4th element) of the second planetary gear mechanism PG2 is connected to the output gear 3.

The carrier Cc (the 8th element) of the third planetary gear mechanism PG3, the ring gear Ra (the 3rd element) of the first planetary gear mechanism PG1, and the carrier Cd (the 11th element) of the fourth planetary gear mechanism PG4 are connected together to form a first connected body Cc-Ra-Cd. The ring gear Rc (the 9th element) of the third planetary gear mechanism PG3 and the sun gear Sb (the 6th element) of the second planetary gear mechanism PG2 are connected together to form a second connected body Rc-Sb. The carrier Ca (the 2nd element) of the first planetary gear mechanism PG1 and the carrier Cb (the 5th element) of the second planetary gear mechanism PG2 are connected together to form a third connected body Ca-Cb.

The automatic transmission TM1 of the present embodiment is equipped with six engagement mechanisms including first to third clutches C1 to C3 and first to third brakes B1 to B3.

The first clutch C1 is a hydraulic operated wet multi-plate clutch and is configured to be switchable between a connected state and a released state, the connected state being in which the sun gear Sc (the 7th element) of the third planetary gear mechanism PG3 and the third connected body Ca-Cb are connected to each other, the released state being in which the connection is released.

The second clutch C2 is a hydraulic operated wet multi-plate clutch and is configured to be switchable between a connected state and a released state, the connected state being in which the sun gear Sd (the 12th element) of the fourth planetary gear mechanism PG4 and the second connected body Rc-Sb are connected to each other, the released state being in which the connection is released.

The third clutch C3 is a hydraulic operated wet multi-plate clutch and is configured to be switchable between a connected state and a released state, the connected state being in which the sun gear Sc (the 7th element) of third planetary gear mechanism PG3 and the ring gear Rd (the 10th element) of the fourth planetary gear mechanism PG4 are connected to each other, the released state being in which the connection is released.

The first brake B1 is a hydraulic operated wet multi-plate brake and is configured to be switchable between a fixed state and a released state, the fixed state being in which the sun gear Sa (the 1st element) of the first planetary gear mechanism PG1 is fixed to the transmission case 1, the released state being in which the fixation is released. The first brake B1 may be formed with a two-way clutch.

The second brake B2 is a hydraulic operated wet multi-plate brake and is configured to be switchable between a fixed state and a released state, the fixed state being in which the carrier Ca (the 2nd element) of the first planetary gear mechanism PG1 is fixed to the transmission case 1, the released state being in which the fixation is released. The second brake B2 may be formed with a two-way clutch.

The third brake B3 is a hydraulic operated wet multi-plate brake and is configured to be switchable between a fixed state and a released state, the fixed state being in which the sun gear Sd (the 12th element) of the fourth planetary gear mechanism PG4 is fixed to the transmission case 1, the released state being in which the fixation is released.

The state of each of the clutches C1 to C3 and the brakes B1 to B3 is shifted by the AT-ECU 5 based on vehicle information such as a running speed of the vehicle.

FIG. 5 is a diagram illustrating the state of engagement mechanism for each of the gear change stages of the automatic transmission TM1 according to the first embodiment, and collectively illustrates the states of the clutches C1 to C3 and the brakes B1 to B3 in the below-described gear change stages. In FIG. 5, "○" in the column of each of the clutches C1 to C3 and the brakes B1 to B3 indicates a connected state or a fixed state, and blank in the column indicates a released state. Hereinafter, cases where respective gear change stages of the automatic transmission TM1 in the first embodiment are achieved will be described with reference to FIGS. 4 and 5.

In order to achieve the 1st gear stage, the first brake B1 is set in a fixed state, the second brake B2 is set in a fixed state, and the third brake B3 is set in a fixed state. Setting the second brake B2 in a fixed state prevents reverse operation of the third connected body Ca-Cb. Setting the first brake in a fixed state causes the rotational speed of the sun gear Sa (the 1st element) of the first planetary gear mechanism PG1 to be set to "0".

Consequently, the 1st to 3rd elements Sa, Ca, Ra of the first planetary gear mechanism PG1 are in a locked state in which relative rotation is not possible, and thus the rotational speed of the first connected body Cc-Ra-Cd including the ring gear Ra (the 3rd element) of the first planetary gear mechanism PG1 is also set to "0". The rotational speed of the ring gear Rb (the 4th element) of the second planetary gear mechanism PG2 is then set to the "1st" illustrated in FIG. 4, the ring gear Rb being connected to the output gear 3, and thus the 1st gear stage is achieved. In order to achieve the 1st gear stage, the third brake B3 is not necessarily in a fixed state. However, the third brake B3 is set in a fixed state herein so as to be able to be shifted from the 1st gear stage to the below-described 2nd gear stage smoothly.

In order to achieve the 2nd gear stage, the first brake B1 is set in a fixed state, the third brake B3 is set in a fixed state, and the second clutch C2 is set in a connected state. Setting the first brake B1 in a fixed state causes the rotational speed of the sun gear Sa (the 1st element) of the first planetary gear mechanism PG1 to be set to "0". In addition, setting the third brake B3 in a fixed state causes the rotational speed of the sun gear Sd (the 12th element) of the fourth planetary gear mechanism PG4 to be set to "0".

Furthermore, setting the second clutch C2 in a connected state causes the rotational speed of the second connected body Rc-Sb to be set to "0" which is the same speed as the rotational speed of the sun gear Sd (the 12th element) of the fourth planetary gear mechanism PG4. The rotational speed of the ring gear Rb (the 4th element) of the second planetary gear mechanism PG2 is then set to the "2nd" illustrated in FIG. 4, the ring gear Rb being connected to the output gear 3, and thus the 2nd gear stage is achieved.

In order to achieve the 3rd gear stage, the first brake B1 and third brake B3 are set in a fixed state, and the third clutch C3 is set in a connected state. Setting the first brake B1 in a fixed state causes the rotational speed of the sun gear Sa (the 1st element) of the first planetary gear mechanism PG1 to be set to "0". In addition, setting the third brake B3 in a fixed state causes the rotational speed of the sun gear Sd (the 12th element) of the fourth planetary gear mechanism PG4 to be set to "0".

Furthermore, setting the third clutch C3 in a connected state causes the rotational speed of the ring gear Rd (the 10th element) of the fourth planetary gear mechanism PG4 to be set to "1" which is the same speed as the rotational speed of the sun gear Sc (the 7th element) of the third planetary gear mechanism PG3, the sun gear Sc being connected to the input shaft 2. Because the rotational speed of the sun gear Sd (the 12th element) of the fourth planetary gear mechanism PG4 is set to "0" and the rotational speed of the ring gear Rd (the 10th element) is set to "1", the rotational speed of the carrier Cd (the 11th element), that is, the rotational speed of the first connected body Cc-Ra-Cd is set to k/(k+1). The rotational speed of the ring gear Rb (the 4th element) of the second planetary gear mechanism PG2 is then set to the "3rd" illustrated in FIG. 4, the ring gear Rb being connected to the output gear 3, and thus the 3rd gear stage is achieved.

In order to achieve the 4th gear stage, the first brake B1 is set in a fixed state, and the second clutch C2 and the third clutch C3 are set in a connected state. Setting the first brake B1 in a fixed state causes the rotational speed of the sun gear Sa (the 1st element) of the first planetary gear mechanism PG1 to be set to "0".

In addition, setting the second clutch C2 in a connected state causes the sun gear Sd (the 12th element) of the fourth planetary gear mechanism PG4 and the second connected body Rc-Sb to rotate at the same speed. Thus, between the third planetary gear mechanism PG3 and the fourth planetary gear mechanism PG4, the carrier Cc (the 8th element) and the carrier Cd (the 11th element) are connected together and the ring gear Rc (the 9th element) and the sun gear Sd (the 12th element) are connected together. Thus, in the 4th gear stage in which the second clutch C2 is in a connected state, a nomogram including those four rotational elements in the third planetary gear mechanism PG3 and the fourth planetary gear mechanism PG4 may be illustrated.

Setting the third clutch C3 in a connected state then causes the rotational speed of the ring gear Rd (the 10th element) of the fourth planetary gear mechanism PG4 to be set to "1" which is the same speed as the rotational speed of the sun gear Sc (the 7th element) of the third planetary gear mechanism PG3, and thus the rotational speed of those two rotational elements out of the four rotational elements included in the third planetary gear mechanism PG3 and the fourth planetary gear mechanism PG4 are set to the same speed "1".

Consequently, the elements included in the third planetary gear mechanism PG3 and the fourth planetary gear mechanism PG4 are set in a locked state in which relative rotation is not possible, and thus all the elements in the third planetary gear mechanism PG3 and the fourth planetary gear mechanism PG4 have a rotational speed of "1". The rotational speed of the third connected body Ca-Cb is then set to h/(h+1), and the rotational speed of the ring gear Rb (the 4th element) of the second planetary gear mechanism PG2 is set to the "4th" illustrated in FIG. 4, the ring gear Rb being connected to the output gear 3, and thus the 4th gear stage is achieved.

Next, the case where the 5th gear stage is achieved will be described. In the automatic transmission TM1 of the present embodiment, the below-described two types of engagement state may be set as engagement states (connected or fixed states) of the clutches C1 to C3 and the brakes B1 to B3 for achieving the 5th gear stage. In the following description, the 5th gear stage achieved by those two types of engagement state are respectively denoted as the "5th gear stage A mode (5thA)" and the "5th gear stage B mode (5thB)".

First, in order to achieve the 5th gear stage A mode (5thA), the first brake B1 is set in a fixed state, and the first clutch C1 and the third clutch C3 are set in a connected state. Setting the first brake B1 in a fixed state causes the rotational speed of the sun gear Sa (the 1st element) of the first planetary gear mechanism PG1 to be set to "0".

In addition, setting the first clutch C1 in a connected state causes the rotational speed of the third connected body Ca-Cb to be set to "1" which is the same speed as the rotational speed of the sun gear Sc (the 7th element) of the third planetary gear mechanism PG3. The rotational speed of the ring gear Rb (the 4th element) of the second planetary gear mechanism PG2 is then set to the "5thA" illustrated in FIG. 4, the ring gear Rb being connected to the output gear 3, and thus the 5th gear stage A mode is achieved.

In the 5th gear stage A mode, the third clutch C3 is not necessarily in a connected state in order to achieve the transmission gear ratio of the 5th gear stage. However, in the 4th gear stage and the below-described 6th gear stage, the third clutch C3 needs to be in a connected state, and thus by setting the third clutch C3 in a connected state in the 5th gear stage A mode, down-shift from the 5th gear stage to the 4th gear stage and up-shift from the 5th gear stage to the 6th gear stage may be smoothly performed.

In order to achieve the 5th gear stage B mode (5thB), the first brake B1 is set in a fixed state, and the first clutch C1 and the second clutch C2 are set in a connected state. Setting the first brake B1 in a fixed state causes the rotational speed of the sun gear Sa (the 1st element) of the first planetary gear mechanism PG1 to be set to "0".

In addition, setting the first clutch C1 in a connected state causes the rotational speed of the third connected body Ca-Cb to be set to "1" which is the same speed as the rotational speed of the sun gear Sc (the 7th element) of the third planetary gear mechanism PG3. The rotational speed of the ring gear Rb (the 4th element) of the second planetary gear mechanism PG2 is then set to the "5thB" illustrated in FIG. 4, the ring gear Rb being connected to the output gear 3, and thus the 5th gear stage B mode is achieved.

In the 5th gear stage B mode, the second clutch C2 is not necessarily in a connected state in order to achieve the transmission gear ratio of the 5th gear stage. However, in the 2nd gear stage and the below-described 8th gear stage, the second clutch C2 needs to be in a connected state, and thus by setting the second clutch C2 in a connected state, skip down-shift from the 5th gear stage to the 2nd gear stage and skip up-shift from the 5th gear stage to the 8th gear stage may be smoothly performed.

In order to achieve the 6th gear stage, the first to third clutches C1 to C3 are set in a connected state. As described above for the 4th gear stage, setting the second clutch C2 and the third clutch C3 in a connected state causes the elements included in the third planetary gear mechanism PG3 and the fourth planetary gear mechanism PG4 to be set in a locked state in which relative rotation is not possible, and thus the rotational speed of the second connected body Rc-Sb is set to "1". In addition, setting the first clutch C1 in a connected state causes the rotational speed of the third connected body Ca-Cb to be set to "1".

Consequently, in the second planetary gear mechanism PG2, the carrier Cb (the 5th element) and the sun gear Sb (the 6th element) are set to the same speed "1", and the elements are set in a locked state in which relative rotation is not possible. The rotational speed of the ring gear Rb (the 4th element) of the second planetary gear mechanism PG2 is then set to the "6th" illustrated in FIG. 4, the ring gear Rb being connected to the output gear 3, and thus the 6th gear stage is achieved.

In order to achieve the 7th gear stage, the third brake B3 is set in a fixed state, and the first clutch C1 and the third clutch C3 are set in a connected state. Setting the second brake B-2 in a reverse prevention state allows normal rotation of the third connected body Ca-Cb.

In addition, setting the third brake B3 in a fixed state causes the rotational speed of the sun gear Sd (the 12th element) of the fourth planetary gear mechanism PG4 to be set to "0". Furthermore, setting the third clutch C3 in a connected state causes the rotational speed of the ring gear Rd (the 10th element) of the fourth planetary gear mechanism PG4 to be set to "1" which is the same speed as the rotational speed of the sun gear Sc (the 7th element) of the third planetary gear mechanism PG3, and thus the rotational speed of the first connected body Cc-Ra-Cd is set to k/(k+1).

In addition, setting the first clutch C1 in a connected state causes the rotational speed of the third connected body Ca-Cb to be set to "1" which is the same speed as the rotational speed of the sun gear Sc (the 7th element) of the third planetary gear mechanism PG3, the sun gear Sc being connected to the input shaft 2. The rotational speed of the ring gear Rb (the 4th element) of the second planetary gear mechanism PG2 is then set to the "7th" illustrated in FIG. 4, the ring gear Rb being connected to the output gear 3, and thus the 7th gear stage is achieved.

In order to achieve the 8th gear stage, the third brake B3 is set in a fixed state, and the first clutch C1 and the second clutch C2 are set in a connected state. Setting the second brake B2 in a reverse prevention state allows normal rotation of the third connected body Ca-Cb.

In addition, setting the third brake B3 in a fixed state causes the rotational speed of the sun gear Sd (the 12th element) of the fourth planetary gear mechanism PG4 to be set to "0". Furthermore, setting the second clutch C2 in a connected state causes the rotational speed of the second connected body Rc-Sb to be set to "0" which is the same speed as the rotational speed of the sun gear Sd (the 12th element) of the fourth planetary gear mechanism PG4. In addition, setting the first clutch C1 in a connected state causes the rotational speed of the third connected body Ca-Cb to be set to "1" which is the same speed as the rotational speed of the sun gear Sc (the 7th element) of the third planetary gear mechanism PG3. The rotational speed of the ring gear Rb (the 4th element) of the second planetary gear mechanism PG2 is then set to the "8th" illustrated in FIG. 4, the ring gear Rb being connected to the output gear 3, and thus the 8th gear stage is achieved.

In order to achieve reverse stage, the second brake B2 is set in a fixed state, the third brake B3 is set in a fixed state, and the third clutch C3 is set in a connected state. Setting the third brake B3 in a fixed state and setting the third clutch C3 in a connected state cause the rotational speed of the first connected body Cc-Ra-Cd to be set to k/(k+1). In addition, setting the second brake B2 in a fixed state prevents normal rotation of the third connected body Ca-Cb and causes the rotational speed of the third connected body Ca-Cb to be set to "0". The rotational speed of the ring gear Rb (the 4th element) of the second planetary gear mechanism PG2 is then set to reverse, that is, "Rvs" illustrated in FIG. 4, the ring gear Rb being connected to the output gear 3, and thus reverse stage is achieved.

Any speed line illustrated by a dashed line in FIG. 4 indicates that when some planetary gear mechanisms out of the four planetary gear mechanisms PG1 to PG4 transmit power, each element in the other planetary gear mechanisms follows the transmission and rotates (idles).

In the automatic transmission TM1 of the present embodiment, it is possible to set the above-described the 5th gear stage A mode and the 5th gear stage B mode, and so the same transmission gear ratio (5th gear stage) may be achieved by different engagement states of the clutches C1 to C3 and the brakes B1 to B3. FIGS. 6A and 6B are tables illustrating shifting states of the clutches C1 to C3 and the brakes B1 to B3 in gear change from and to the 5th gear stage; FIG. 6A is a table illustrating the shifting states in the 5th gear stage A mode; and FIG. 6B is a table illustrating the shifting states in the 5th gear stage B mode.

As previously described, the third clutch C3 is engaged in the 5th gear stage A mode. Thus, as illustrated in FIG. 6A, gear change may be made between the 3rd gear stage (3rd) and the 5th gear stage A mode (5thA), between the 4th gear stage (4th) and the 5th gear stage A mode (5thA), between the 5th gear stage A mode (5thA) and the 6th gear stage (6th), and between the 5th gear stage A mode (5thA) and the 7th gear stage (7th) by shifting engagement between only two of the clutches C1 to C3 and the brakes B1 to B3 for each gear change. Specifically, for gear change between the third gear stage (3rd) and the 5th gear stage A mode (5thA), engagement is shifted between the third brake B3 (3rd gear stage) and the first clutch C1 (5th gear stage A mode); for gear change between the 4th gear stage (4th) and the 5th gear stage A mode (5thA), engagement is shifted between the second clutch C2 (4th gear stage) and the first clutch C1 (5th gear stage A mode); for gear change between the 5th gear stage A mode (5thA) and the 6th gear stage (6th), engagement is shifted between the first brake B1 (5th gear stage A mode) and the second clutch C2 (6th gear stage); and for gear change between the 5th gear stage A mode (5thA) and the 7th gear stage (7th), engagement is shifted between the first brake B1 (5th gear stage A mode) and the third brake B3 (7th gear stage). In this manner, for gear change from a state in which the 5th gear stage A mode is achieved, by shifting engagement between only two of the clutches C1 to C3 and the brakes B1 to B3, gear change by one stage (gear change to an adjacent gear change stage) and gear change with one stage skipped may be made.

As previously described, the second clutch C2 is engaged in the 5th gear stage B mode. Thus, as illustrated in FIG. 6B, gear change may be made between the 2nd gear stage (2nd) and the 5th gear stage B mode (5thB), between the 4th gear stage (4th) and the 5th gear stage B mode (5thB), between the 5th gear stage B mode (5thB) and the 6th gear stage (6th), and between the 5th gear stage B mode (5thB) and the 8th gear stage (8th) by shifting engagement between only two of the clutches C1 to C3 and the brakes B1 to B3 for each gear change. Specifically, for gear change between the 2nd gear stage (2nd) and the 5th gear stage B mode (5thB), engagement is shifted between the third brake B3 (2nd gear stage) and the first clutch C1 (5th gear stage B mode); for gear change between the 4th gear stage (4th) and the 5th gear stage B mode (5thB), engagement is shifted between the third clutch C3 (4th gear stage) and the first clutch C1 (5th gear stage B mode); for gear change between the 5th gear stage B mode (5thB) and the 6th gear stage (6th), engagement is shifted between the first brake B1 (5th gear stage B mode) and the third clutch C3 (6th gear stage); and for gear change between the 5th gear stage B mode (5thB) and the 8th gear stage (8th), engagement is shifted between the first brake B1 (5th gear stage B mode) and the third brake B3 (8th gear stage). In this manner, for gear change from a state in which the 5th gear stage B mode is achieved, by shifting engagement between only two of the clutches C1 to C3 and the brakes B1 to B3, gear change by one stage (gear change to an adjacent gear change stage) and gear change with two stages skipped may be made.

Consequently, in the automatic transmission TM1 of the present embodiment, both of the above-described the 5th gear stage A mode and the 5th gear stage B mode may be set as engagement states of the clutches C1 to C3 and the brakes B1 to B3 for achieving the ratio of the 5th gear stage, and so many gear change stages may be assured which allow shift between the gear change stages by shifting engagement between only two of the clutches C1 to C3 and the brakes B1 to B3. Therefore, increased flexibility in switching between the gear change stages is provided, and thus linearity of the driving force of the vehicle is assured.

Figure 7:
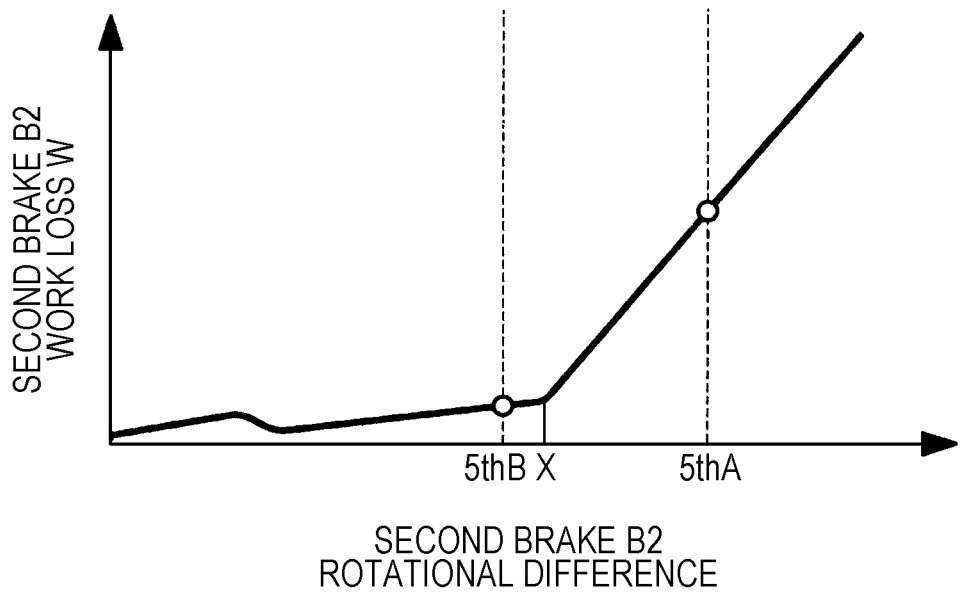
FIG. 7 is a graph illustrating the relationship between rotational difference and work loss of a second brake.

FIG. 7 is a graph illustrating the relationship between the rotational difference (rotational difference of a friction material) and the work loss of the second brake B2 for a predetermined rotational input to the automatic transmission TM1. As illustrated by the graph of FIG. 7, in the second brake B2, the work loss increases as the rotational difference of the friction material increases. The value of work loss for the rotational difference tends to increase rapidly after the rotational difference exceeds a predetermined threshold value (threshold value X in FIG. 7). A state in which the 5th gear stage A mode (5thA) is selected indicates that the state occurs in an area having a high rotational difference where the rotational difference of the second brake B2 exceeds the above-mentioned threshold value X for a rotational input to the automatic transmission TM1. Thus, when the work loss W in the second brake B2 becomes excessive, the acceleration of the vehicle is reduced and the temperature of the hydraulic oil in the automatic transmission TM1 increases. On the other hand, a state in which the 5th gear stage B mode (5thB) is selected indicates that the state occurs in an area having a low rotational difference where the rotational difference of the second brake B2 falls below the above-mentioned threshold value X for a rotational input to the automatic transmission TM1. Thus, the work loss in the second brake B2 has a lower amount compared with the work loss amount in a state where the 5th gear stage A mode (5thA) is selected.

Figure 8:
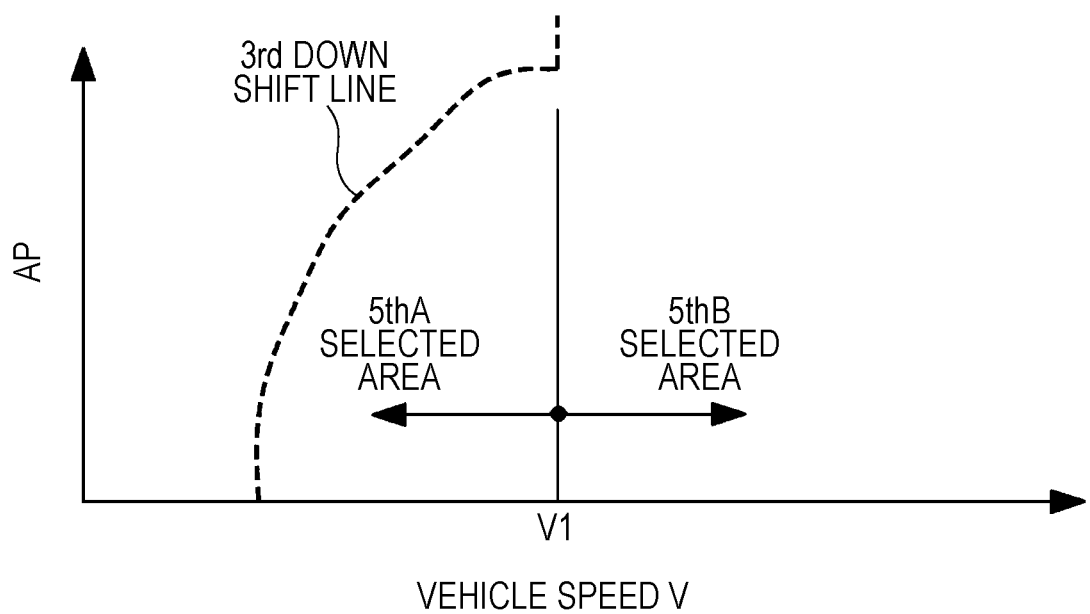
FIG. 8 is a graph illustrating a relationship between a transmission characteristic (third gear down-shift line) and a vehicle speed for shifting between the 5th gear stage A mode and the 5th gear stage B mode, with respect to vehicle speed and accelerator opening.

Hereinafter, the method for selecting the above-described 5th gear stage A mode (5thA) and 5th gear stage B mode (5thB) in the automatic transmission TM1 of the present embodiment will be described. FIG. 8 is a graph (shift map) illustrating a relationship between a transmission characteristic (third gear down-shift line) and a vehicle speed for shifting between the 5th gear stage A mode and the 5th gear stage B mode, with respect to vehicle speed and accelerator opening. In the shift map of FIG. 8, the horizontal axis indicates a vehicle speed V and the vertical axis indicates an engine load, that is, accelerator pedal opening AP. The line illustrated by a dotted line is a down-shift line from the 5th gear stage to the 3rd gear stage. The control of the automatic transmission TM1 of the present embodiment allows a gear change stage to be shifted (down-shift and up-shift) based on the area (transmission characteristic) on the map (shift map) of the predetermined vehicle speed V and the accelerator pedal opening AP. As illustrated in the shift map of FIG. 8, a critical vehicle speed (upper limit vehicle speed) for down-shift from the 5th gear stage to the 3rd gear stage is set to V1. That is, with the vehicle speed higher than or equal to the critical vehicle speed V1, gear change (skip down-shift) from the 5th gear stage to the 3rd gear stage does not occur. The critical vehicle speed V1 serves as a determination vehicle speed for shifting between the 5th gear stage A mode (5thA) and the 5th gear stage B mode (5thB). That is, when the vehicle speed V is lower than the critical vehicle speed V1 (V<V1), the 5th gear stage A mode is selected which allows skip gear change to the 3rd gear stage only by shifting between two engagement mechanisms. On the other hand, when the vehicle speed V is higher than or equal to the critical vehicle speed V1 (V≥V1), the 5th gear stage B mode is selected in which the work loss in the second brake B2 is comparatively (relatively) low, although the 5th gear stage A mode does not allow skip gear change to the 3rd gear stage only by shifting between two engagement mechanisms. Consequently, reduction in both down-shift response and work loss may be achieved.

Figure 9:
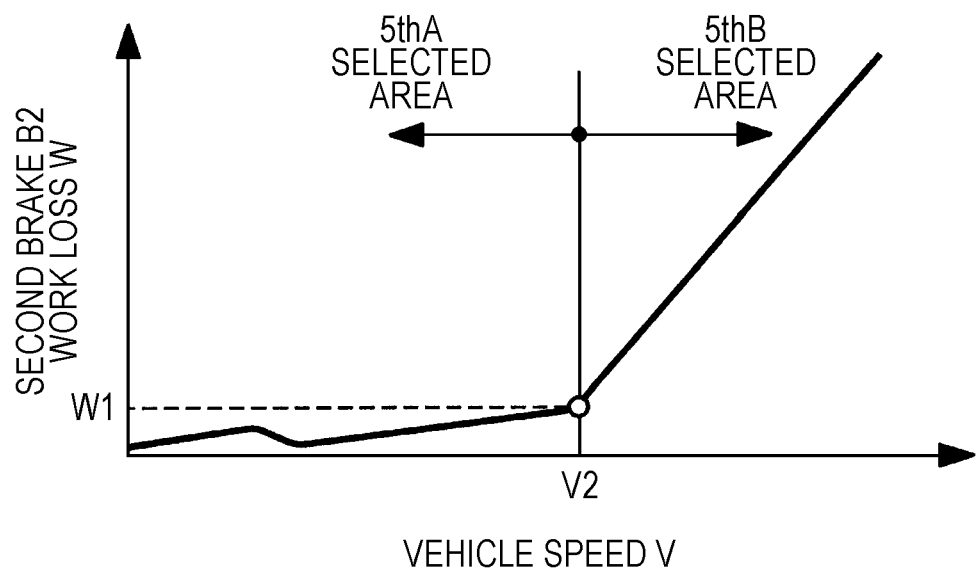
FIG. 9 is a graph illustrating a relationship between vehicle speed and work loss of the second brake, the relationship indicating a vehicle speed for shifting between the 5th gear stage A mode and the 5th gear stage B mode.

FIG. 9 is a graph illustrating a relationship between the vehicle speed V and the work loss W of the second brake B2, the relationship indicating a vehicle speed for shifting between the 5th gear stage A mode and the 5th gear stage B mode. As illustrated in FIG. 9, the work loss W of the second brake B2 increases as the vehicle speed V increases. The value of the work loss W for the vehicle speed V tends to increase rapidly in the area where the vehicle speed V exceeds a predetermined threshold value V2 (V≥V2). As previously described, in a state in which the 5th gear stage B mode is selected, the work loss in the second brake B2 is lower compared with a state in which the 5th gear stage A mode is selected. Therefore, when the vehicle speed V is lower than the above-mentioned predetermined threshold value V2 (V<V2) in the area where the 5th gear stage is set, the 5th gear stage A mode is selected. On the other hand, when the vehicle speed V is higher than or equal to the predetermined threshold value V2 (V≥V2), the 5th gear stage B mode is selected. In this manner, the 5th gear stage A mode is used in an area of a vehicle speed which is lower than a certain vehicle speed at which the work loss in the second brake B2 increases.

As described above, with the control device for the automatic transmission TM1 of the present embodiment, when the 5th gear stage is set which is a gear change stage having a plurality of engagement combinations in type of the engagement elements (the clutches C1 to C3 and the brakes B1 to B3), a combination of the engagement mechanisms (the clutches C1 to C3, the brakes B1 to B3) for achieving the 5th gear stage is selected according to the vehicle speed V of the vehicle. The engagement combination of the engagement mechanisms for setting the 5th gear stage A mode out of the engagement combinations of the engagement mechanisms for achieving the 5th gear stage, causes the work loss in the second brake B2 to increase at a high vehicle speed (5th gear stage A mode), and thus the engagement combination of the 5th gear stage A mode is avoided according to the vehicle speed, and another engagement combination, that is, the 5th gear stage B mode is selected, and thereby the work loss in the second brake B2 may be reduced. Consequently, increase in the acceleration of the vehicle and reduction in increase in the temperature of hydraulic oil in the automatic transmission TM1 may be achieved.

The AT-ECU 5, which controls the automatic transmission TM1 of the present embodiment, has the shift map (transmission characteristic) that defines an area of gear change stage which is settable by the automatic transmission TM1, according to the vehicle speed V. As the condition of vehicle speed for selecting the engagement combination of the 5th gear stage A mode, the vehicle speed (V≥V1) is set which allows a skip gear change (down-shift) from the 5th gear stage to the 3rd gear stage on the shift map.

That is, the engagement combination of the 5th gear stage A mode between the engagement combinations of the engagement mechanisms for achieving the 5th gear stage is capable of making a skip gear change to the 3rd gear stage by shifting engagement between less number of engagement mechanisms, and thus the 5th gear stage A mode is selected at a vehicle speed (V≤V1) which allows down-shift to the 3rd gear stage.

With this configuration, as the condition of the vehicle speed V for selecting one of the 5th gear stage A mode and the 5th gear stage B mode as an engagement combination for achieving the 5th gear stage, the vehicle speed is set which allows a skip gear change from the 5th gear stage to the 3rd gear stage which is at least two gear stages away to a lower gear in the transmission characteristic, and thereby skip gear change to a lower gear stage may be made with engagement shift between less number of engagement mechanisms by the selection of the engagement combination. Consequently, the responsiveness of a shift (down-shift) of a gear change stage of the automatic transmission TM1 to a lower gear may be assured. Therefore, favorable driving performance (drivability) of the vehicle may be assured.

In the automatic transmission TM1 of the present embodiment, a condition of the vehicle speed for selecting the engagement combination of the 5th gear stage B mode is defined such that the work loss W, which occurs in the second brake B2 at the vehicle speed (V≥V2), is higher than or equal to a predetermined amount, the second brake B2 being the engagement mechanism released when the 5th gear stage A mode is selected.

With this configuration, the work loss W occurs in the second brake B2 at a high vehicle speed may be reduced, and thus the work loss in the automatic transmission TM1 at a high vehicle speed may be effectively reduced. Therefore, increase in the acceleration of the vehicle may be achieved and increase in the temperature of hydraulic oil in the automatic transmission TM1 may be reduced.

When the above-described the 5th gear stage is initially set, the AT-ECU 5, which controls the automatic transmission TM1 of the present embodiment, selects the engagement combination of the 5th gear stage A mode, and subsequently, when the vehicle speed V exceeds V2, the AT-ECU 5 causes a shift from the engagement combination of the 5th gear stage A mode to the engagement combination of the 5th gear stage B mode.

With this configuration, the 5th gear stage A mode out of the 5th gear stage A mode and the 5th gear stage B mode allows gear change from another gear change stage by engagement shift between less number of engagement mechanisms, but causes the work loss in the automatic transmission TM1 to increase at a high vehicle speed. Thus, when the 5th gear stage is initially set, the engagement combination of the 5th gear stage A mode is selected, and subsequently, the engagement combination of the 5th gear stage B mode having less amount of work loss in the automatic transmission TM1 may be selected according to the vehicle speed V. Consequently, improvement in the driving performance (drivability) of the vehicle and reduction of the work loss of the automatic transmission TM1 may be both achieved by quick and smooth shift of a gear change stage.

In the automatic transmission TM1 of the present embodiment, the ring gear Rd of the fourth planetary gear mechanism PG4 which performs no torque transmission is engaged with the input shaft 2 by the third clutch C3 which is one of the engagement mechanisms engaged by the engagement combination of the 5th gear stage A mode which is selected at initial setting of the 5th gear stage. With this configuration, increase in the work loss in the automatic transmission TM1 may be prevented by engagement of the third clutch C3 in the engagement combination of the 5th gear stage A mode.

In the automatic transmission TM1 of the present embodiment, the engagement combination of the 5th gear stage A mode selected at initial setting of the 5th gear stage allows gear change from the 5th gear stage to the 4th gear stage or the 6th gear stage, and gear change from the 5th gear stage to the 3rd gear stage or the 7th gear stage by shifting the engagement of the third clutch C3 engaged by the engagement combination of the 5th gear stage A mode to the engagement of another engagement mechanism. With this configuration, gear change from the 5th gear stage to the 4th gear stage or 6th gear stage which is one gear stage away, or gear change from the 5th gear stage to the 3rd gear stage or 7th gear stage which is two gear stages away may be made quickly and smoothly, and thus stable gear change control by the automatic transmission TM1 may be achieved.

In the automatic transmission TM1 of the present embodiment, the engagement combination of the 5th gear stage B mode allows a skip gear change from the 5th gear stage to the 2nd gear stage or 8th gear stage which is three gear stages away lower or higher by shifting the engagement of the second clutch C2 engaged by the engagement combination of the 5th gear stage B mode to the engagement of another engagement mechanism, the engagement combination of the 5th gear stage B mode being an engagement combination shifted from the engagement combination of the 5th gear stage A mode which is initially selected according to the vehicle speed V when the 5th gear stage is set.

With this configuration, by shifting the engagement of the second clutch C2 engaged by the engagement combination of the 5th gear stage B mode to the engagement of another engagement mechanism, a skip gear change may be made from the 5th gear stage to the 2nd gear stage or 8th gear stage which is three gear stages away lower or higher, and thereby the skip gear change may be made quickly and smoothly. Therefore, stable gear change control by the automatic transmission TM1 may be achieved.

Second Embodiment

Next, an automatic transmission according to a second embodiment of the present disclosure will be described. In the description of the second embodiment and corresponding drawings, components which are the same as or corresponding to those in the first embodiment are labeled with the same symbols, and hereinafter detailed description of the components will be omitted. The matter other than what is described below and the matter other than what is illustrated are the same as those in the first embodiment.

Figure 10:
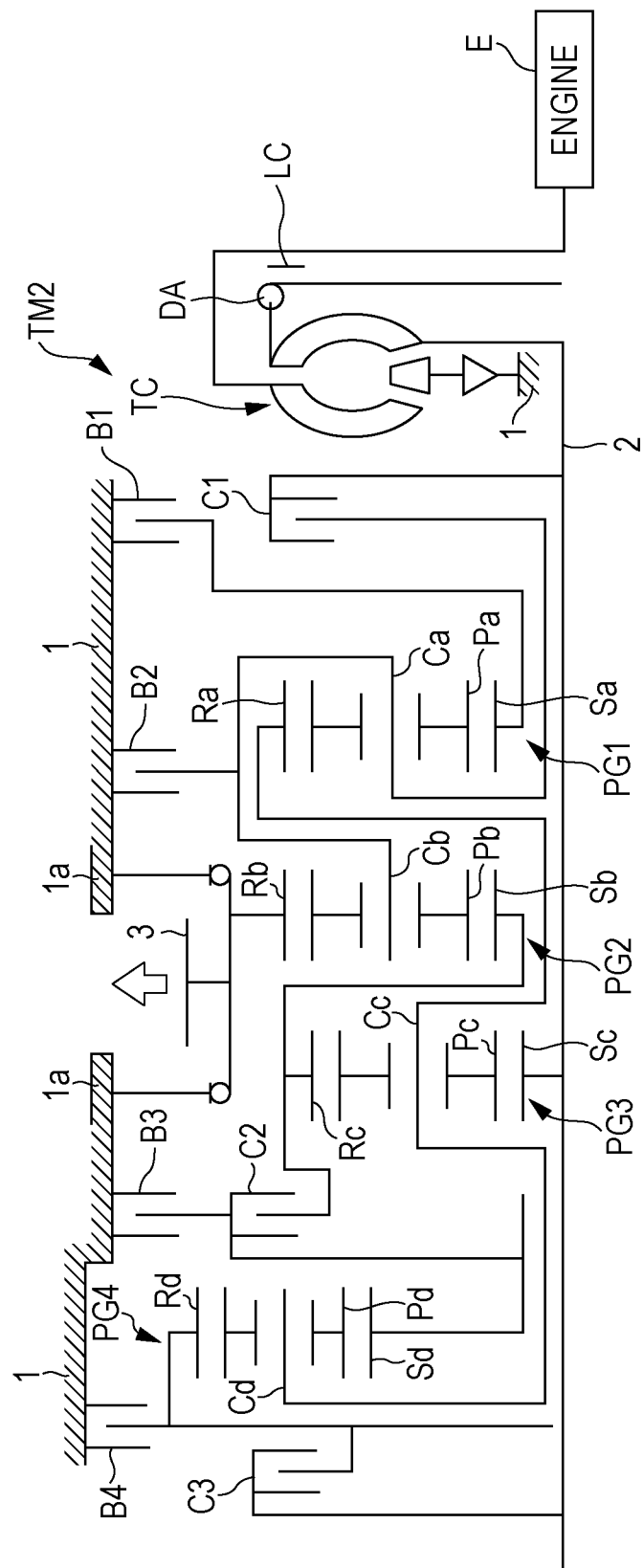
FIG. 10 is a skeleton diagram illustrating an automatic transmission according to a second embodiment of the present disclosure.

FIG. 10 is a skeleton diagram illustrating an automatic transmission TM2 according to the second embodiment of the present disclosure. As illustrated in FIG. 10, the automatic transmission TM2 of the present embodiment includes seven engagement mechanisms consisting of the first to third clutches C1 to C3 and the first to fourth brakes B1 to B4 by adding the fourth brake B4 as an engagement mechanism to the automatic transmission TM1 according to the first embodiment.

The fourth brake B4 is a wet multi-plate brake and is configured to be switchable between a fixed state and a released state, the fixed state being in which the ring gear Rd (the 10th element) of the fourth planetary gear mechanism PG4 is fixed to the transmission case 1, the released state being in which the fixation is released. Similarly to the clutches C1 to C3 and the brakes B1 to B3, the state of the fourth brake B4 is changed by the AT-ECU 5 based on vehicle information such as a running speed of the vehicle.

Figure 11:
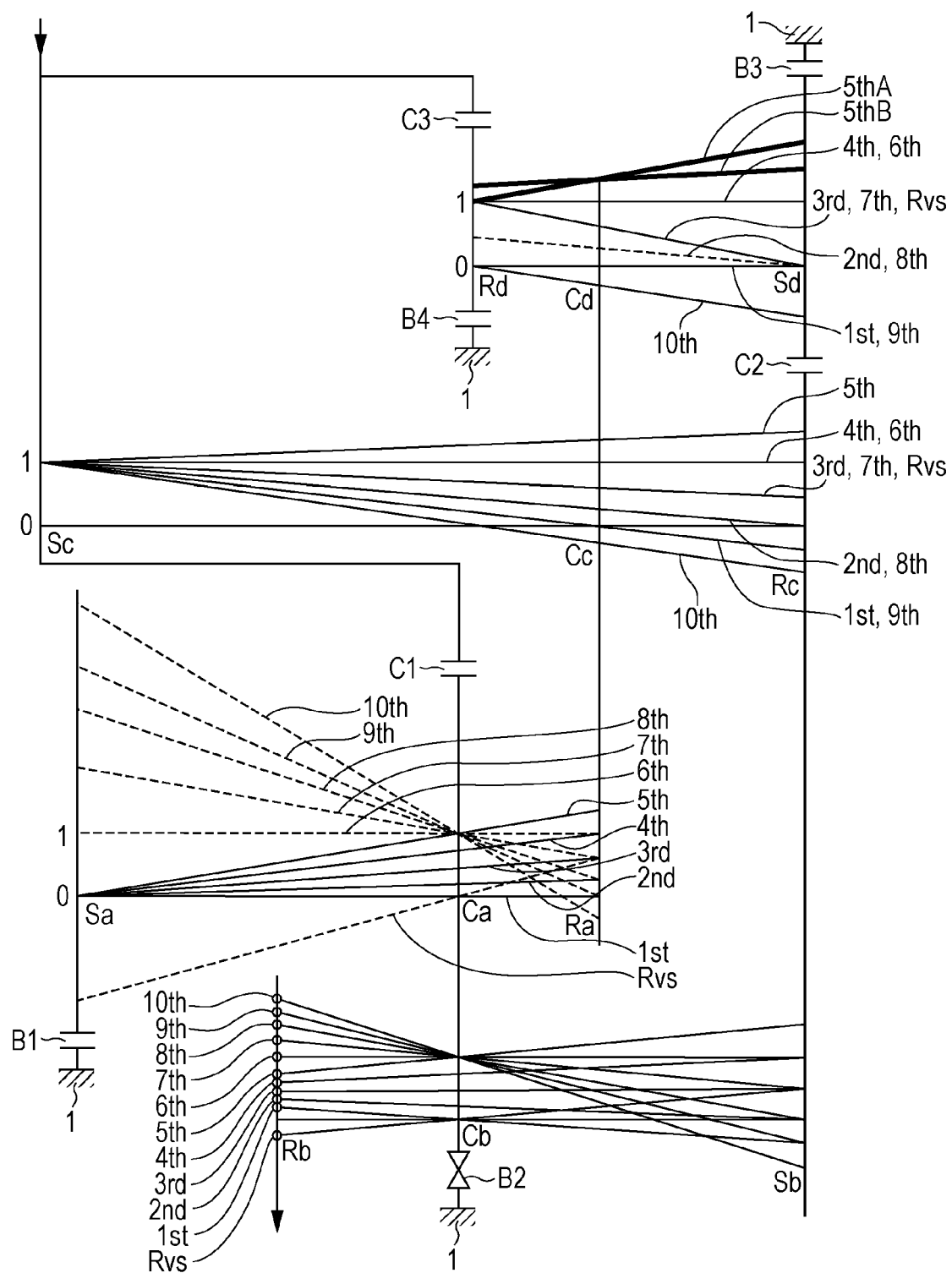
FIG. 11 is a nomogram illustrating ratios between relative speeds of the components of first to fourth planetary gear mechanisms included in the automatic transmission according to the second embodiment.

FIG. 11 is a nomogram illustrating ratios between relative speeds of the components of first to fourth planetary gear mechanisms included in the automatic transmission TM2 according to the second embodiment. FIG. 12 is a table illustrating the state of engagement mechanism for each of the gear change stages in the automatic transmission TM2 according to the second embodiment. Hereinafter, cases where respective gear change stages of the automatic transmission TM2 according to the second embodiment are achieved will be described with reference to FIGS. 11 and 12. The 1st to 8th gear stages and reverse stage are achieved in the same manner as those stages are achieved by the automatic transmission TM1 in the first embodiment, and thus description is omitted.

In order to achieve the 9th gear stage, the third brake B3 and the fourth brake B4 are set in a fixed state, and the first clutch C1 is set in a connected state. Setting the third brake B3 in a fixed state causes the rotational speed of the sun gear Sd (the 12th element) of the fourth planetary gear mechanism PG4 to be set to "0". In addition, setting the fourth brake B4 in a fixed state causes the rotational speed of the ring gear Rd (the 10th element) of the fourth planetary gear mechanism PG4 to be set to "0", too. Therefore, the elements Sd, Cd, Rd of the fourth planetary gear mechanism PG4 are in a locked state in which relative rotation is not possible, and thus the rotational speed of the first connected body Cc-Ra-Cd including the carrier Cd (the 11th element) of the fourth planetary gear mechanism PG4 is also set to "0".

Furthermore, setting the first clutch C1 in a connected state causes the rotational speed of the third connected body Ca-Cb to be set to "1" which is the same speed as the rotational speed of the sun gear Sc (the 7th element) of the third planetary gear mechanism PG3. The rotational speed of the ring gear Rb (the 4th element) of the second planetary gear mechanism PG2 is then set to the "9th" illustrated in FIG. 11, the ring gear Rb being connected to the output gear 3, and thus the 9th gear stage is achieved.

In order to achieve the 10th gear stage, the fourth brake B4 are set in a fixed state, and the first clutch C1 and the second clutch C2 are set in a connected state. Setting the second clutch C2 in a connected state causes the second connected body Rc-Sb and the sun gear Sd (the 12th element) of the fourth planetary gear mechanism PG4 to rotate at the same speed. In addition, setting the fourth brake B4 in a fixed state causes the rotational speed of the ring gear Rd (the 10th element) of the fourth planetary gear mechanism PG4 to be set to "0". In addition, setting the first clutch C1 in a connected state causes the rotational speed of the third connected body Ca-Cb to be set to "1" which is the same speed as the rotational speed of the sun gear Sc (the 7th element) of the third planetary gear mechanism PG3. The rotational speed of the ring gear Rb (the 4th element) of the second planetary gear mechanism PG2 is then set to the "10th" illustrated in FIG. 11, the ring gear Rb being connected to the output gear 3, and thus the 10th gear stage is achieved.

With the automatic transmission TM2 in the second embodiment, gear change to any of forward 10 gear stages may be made. Similarly to the automatic transmission TM1 in the first embodiment, two types of engagement states, the 5th gear stage A mode and the 5th gear stage B mode may be set as engagement states (connected or fixed states) of the clutches C1 to C3 and the brakes B1 to B4 for achieving the 5th gear stage. An engagement combination of the clutches C1 to C3 and the brakes B1 to B4 for achieving the 5th gear stage (the 5th gear stage A mode, the 5th gear stage B mode) is selected according to the vehicle speed V of the vehicle.

So far, the embodiments of the present disclosure have been described, however, the present disclosure is not limited to the above-described embodiments and various modifications may be made in a scope of the technical concepts described in the claims, the description and the drawings. For example, in the above-described embodiments, the case has been described where the 5th gear stage is such a gear change stage that has a plurality of engagement combinations in type of the engagement mechanisms (clutches C1 to C3, brakes B1 to B3) for achieving the gear change stage. Such a gear change stage may be other than the 5th gear stage.

In the above-described embodiments, the case has been described where the ring gear Rb of the second planetary gear mechanism PG2 and the output gear 3 are fixed. However, the ring gear Rc of the third planetary gear mechanism PG3 and the output gear 3 may be fixed to each other.

Each of the first brake B1 and the second brake B2 is formed with a wet multi-plate. However, in addition to this, the first brake B1 may be formed with a wet multi-plate brake and the second brake B2 may be formed with a two-way clutch; the first brake B1 may be formed with a two-way clutch and the second brake B2 may be formed with a wet multi-plate brake; or at least one of the first brake B1 and the second brake B2 may be formed with an engaging mechanism.

When the first brakes B1 is formed with a two-way clutch, it is sufficient that the 1st to the 5th gear stages are set in a reverse prevention state, and to activate engine braking at each gear stage, the 1st to the 5th gear stages are switched to a forward prevention state.

The fourth brake B4 may be formed with an engaging mechanism, and in this case, loss due to clutch dragging may be reduced.

In the automatic transmission TM2 in the second embodiment, one of the gear change stages (for example, 10th gear stage) may be omitted and gear change of the 9th forward gear stage may be made.

A control device for an automatic transmission according to an embodiment of the present disclosure includes: the automatic transmission including a drive source (E) of a vehicle, an input shaft (2) to which driving force from a drive source (E) of a vehicle is inputted, a plurality of planetary gear mechanisms (PG1 to PG4) each equipped with rotational elements including a sun gear, a carrier, and a ring gear, and a plurality of engagement mechanisms (C1 to C3, B1 to B3) each configured to releasably connect two of the rotational elements of the planetary gear mechanisms (PG1 to PG4) or to releasably fix one of the rotational elements to a member (1) on a fixed side, the automatic transmission (TM) being configured to achieve a plurality of gear change stages with different transmission gear ratios by an engagement combination of the engagement mechanisms (C1 to C3, B1 to B3), and to output the driving force (E) from the drive source to an output shaft (4) at the transmission gear ratios of the gear change stages; a control unit (5) configured to set one of the gear change stages according a running condition of the vehicle; and a vehicle speed detector (201 to 203) configured to detect a vehicle speed (V) which is a running condition of the vehicle. At least one gear change stage (5th) out of the gear change stages achieved by the automatic transmission (TM) has a plurality of engagement combinations in type including the engagement combination, as engagement combinations of the engagement mechanisms (C1 to C3, B1 to B3) for achieving the at least one gear change stage (5th), and when the at least one gear change stage (5th) having the plurality of engagement combinations in type is set, the control unit (5) selects the engagement combination of the engagement mechanisms (C1 to C3, B1 to B3) for achieving the at least one gear change stage according to the vehicle speed (V) of the vehicle.

In the control device for an automatic transmission according to an embodiment of the present disclosure, when a gear change stage having a plurality of engagement combinations in type is set, an engagement combination of the engagement mechanisms for achieving the gear change stage may be selected according to the speed of the vehicle. In this manner, when one of the engagement combinations of the engagement mechanisms which achieves the gear change stage is a certain engagement combination in which the work loss in the automatic transmission increases at a high vehicle speed, the certain engagement combination is avoided and another engagement combination is selected according to the vehicle speed, and thereby the work loss in the automatic transmission at a high vehicle speed may be effectively reduced. Consequently, increase in the acceleration and fuel efficiency of the vehicle and reduction in increase in the temperature of hydraulic oil in the automatic transmission may be achieved. When one of the engagement combinations of the engagement mechanisms which achieve the gear change stage is a certain engagement combination which allows shifting of a gear change stage to a target gear change stage by engagement shift between less number of engagement mechanisms, the certain engagement combination is selected according to the vehicle speed, and thereby smooth shift to the target gear change stage may be made. Consequently, the driving performance (drivability) and fuel efficiency of the vehicle may be improved. In this manner, improvement of the driving performance and fuel efficiency of the vehicle and reduction of the work loss in the automatic transmission may be both achieved by a quick and smooth shift to a gear change stage.

In the above-described control device for an automatic transmission, the control unit (5) has a transmission characteristic that defines an area of gear change stage according to the vehicle speed (V), the area being settable by the automatic transmission (TM), and a condition of vehicle speed (V) for selecting one (5thA) of the engagement combinations may be defined such that the vehicle speed (V≤V1) allows a skip gear change from the at least one gear change stage (5th) having the plurality of engagement combinations in type to a gear change stage (3rd) which is at least two gear stages away to a lower gear in the transmission characteristic.

With this configuration, a condition of vehicle speed for selecting one of the engagement combinations is defined such that the vehicle speed allows a skip gear change from the gear change stage having the plurality of engagement combinations in type to a gear change stage which is at least two gear stages away to a lower gear in the transmission characteristic, and thus a skip gear change (down-shift) to a lower gear stage may be made by engagement shift between less number of engagement mechanisms. Consequently, the responsiveness of shift to a lower gear stage may be assured. Therefore, improvement of the driving performance (drivability) of the vehicle may be achieved.

In the above-described control device for an automatic transmission, a condition of vehicle speed (V) for selecting one (5thB) of the engagement combinations may be defined such that with the vehicle speed (V≥V2), an amount of work loss (W) occurs in a friction member of an engagement mechanism (B2), which is released when another engagement combination (5thA) is selected, is higher than or equal to a predetermined amount (W1).

With this configuration, a condition of vehicle speed for selecting one of the engagement combinations is defined such that the vehicle speed exceeds a certain speed at which an amount of work loss occurs in an engagement mechanism, which is released when another engagement combination is selected, is higher than or equal to a predetermined amount, and thus the work loss occurs in the engagement mechanism according to the vehicle speed may be reduced. Consequently, the work loss of the automatic transmission may be effectively reduced. Therefore, increase in the acceleration and fuel efficiency of the vehicle may be achieved and increase in the temperature of hydraulic oil in the automatic transmission may be reduced.

In the above-described control device for an automatic transmission, when the at least one gear change stage (5th) having the plurality of engagement combinations in type is initially set, the control unit (5) may select one (5thA) of the engagement combinations, and subsequently, may cause a shift from the initially selected engagement combination (5thA) to another engagement combination (5thB) according to the vehicle speed (V).

With this configuration, for example, one of the engagement combinations achieving the gear change stage having the plurality of engagement combinations in type allows gear change from another gear change stage by engagement shift between less number of engagement mechanisms. However, in the case where the engagement combination causes the work loss in the automatic transmission to increase at a high vehicle speed, the engagement combination is selected at the initial setting of the gear change stage, and subsequently, the engagement combination may be avoided and another engagement combination may be selected according to the vehicle speed. Consequently, improvement of the driving performance (drivability) of the vehicle and reduction of the work loss in the automatic transmission at a high vehicle speed may be both achieved by a quick and smooth shift to a gear change stage.

In the above-described control device for an automatic transmission, at least one (C3) of the engagement mechanisms which are engaged by an engagement combination may be configured to engage a rotational element (Rd) of a planetary gear mechanism (PG4) that performs no torque transmission, the engagement combination (5thA) being selected at initial setting of the at least one gear change stage (5th) having the plurality of engagement combinations in type. With this configuration, increase in the work loss in the automatic transmission may be prevented by engagement of the engagement mechanism.

In the above-described control device for an automatic transmission, an engagement combination (5thA) selected at initial setting of the at least one gear change stage (5th) having the plurality of engagement combinations in type may allow gear change from the gear change stage (5th) to a gear change stage which is one gear stage (4th, 6th) or two gear stages (3rd, 7th) away higher or lower by shifting engagement of one (C3) of the engagement mechanisms which is engaged by the engagement combination to another engagement of the engagement mechanisms.

With this configuration, shift operation between the gear change stage having the plurality of engagement combinations in type and another gear change stage may be performed quickly and smoothly, and thus stable gear change control by the automatic transmission may be achieved.

In the above-described control device for an automatic transmission, the another engagement combination (5thB) may allow gear change to a gear change stage (2nd, 8th) which is three gear stages away higher or lower by shifting engagement (C2) of one of a plurality of engagement mechanisms, the another engagement combination being shifted from the initially selected engagement combination (5thA) according to the vehicle speed (V) when the at least one gear change stage (5th) having the plurality of engagement combinations in type is set.

With this configuration, by shifting engagement of only one of the plurality of engagement mechanisms, a skip gear change may be made quickly and smoothly from the gear change stage having the plurality of engagement combinations in type to a gear change stage which is three gear stages away higher or lower, and thus stable gear change control by the automatic transmission may be achieved. The symbols in the above parentheses are provided so that the symbols of the components in the below-described embodiments are each illustrated as an example of the present disclosure.

Obviously, numerous modifications and variations of the present invention are possible in light of the above teachings. It is therefore to be understood that within the scope of the appended claims, the invention may be practiced otherwise than as specifically described herein.

What is claimed is:

1. A control apparatus for an automatic transmission which includes an input shaft to which a driving force generated by a drive source of a vehicle is transferred, a plurality of planetary gear mechanisms each including rotational elements having a sun gear, a carrier, and a ring gear, and a plurality of engagement mechanisms each configured to releasably connect two of the rotational elements of the plurality of planetary gear mechanisms or to releasably fix at least one of the rotational elements to a member on a fixed side, the automatic transmission being configured to achieve a plurality of gear change stages with different transmission gear ratios, the control apparatus comprising:

a vehicle speed detector configured to detect a vehicle speed; and a controller configured to set one of the plurality of gear change stages according to a running condition of the vehicle and configured to select one of a plurality of engagement combination states of the plurality of engagement mechanisms to achieve at least one gear change stage out of the plurality of gear change stages in a case in which the controller sets the at least one gear change stage, the at least one gear change stage having the plurality of engagement combination states to achieve the at least one gear change stage, wherein the controller selects the one of the plurality of engagement combination states according to the vehicle speed detected by the vehicle speed detector, wherein the controller has a transmission characteristic that defines an area of gear change stage for the vehicle speed, the gear change stage being settable by the automatic transmission, and a condition of the vehicle speed for selecting one of the plurality of engagement combination states is defined such that the vehicle speed allows a skip gear change from the at least one gear change stage having the plurality of engagement combination states to a gear change stage which is at least two gear stages away to a lower gear in the transmission characteristic.

2. The control apparatus for the automatic transmission according to claim 1, wherein the plurality of engagement combination states have a same transmission gear ratio.

3. The control apparatus for the automatic transmission according to claim 2,
wherein the controller is configured to determine whether the vehicle speed detected by the vehicle speed detector exceeds a predetermined threshold value and:
when the vehicle speed exceeds the predetermined threshold value, permit selection of only one of the plurality of engagement combination states; and
when the vehicle speed is less than or equal to the predetermined threshold value, permit selection of any of the plurality of engagement combination states.

4. The control apparatus for the automatic transmission according to claim 2,
wherein the plurality of engagement combination states each provide a fifth gear stage so that the at least one gear change stage is the fifth gear stage.

5. The control apparatus for the automatic transmission according to claim 1,
wherein the plurality of engagement combination states each provide a fifth gear stage so that the at least one gear change stage is the fifth gear stage.

6. The control apparatus for the automatic transmission according to claim 5,
wherein the selecting controller is configured to determine whether the vehicle speed detected by the vehicle speed detector exceeds a predetermined threshold value and:
when the vehicle speed exceeds the predetermined threshold value, permit selection of only one of the plurality of engagement combination states; and
when the vehicle speed is less than or equal to the predetermined threshold value, permit selection of any of the plurality of engagement combination states.

7. A control apparatus for the automatic transmission which includes an input shaft to which a driving force generated by a drive source of a vehicle is transferred, a plurality of planetary gear mechanisms each including rotational elements having a sun gear, a carrier, and a ring gear, and a plurality of engagement mechanisms each configured to releasably connect two of the rotational elements of the plurality of planetary gear mechanisms or to releasably fix at least one of the rotational elements to a member on a fixed side, the automatic transmission being configured to achieve a plurality of gear change stages with different transmission gear ratios, the control apparatus comprising:
a vehicle speed detector configured to detect a vehicle speed; and
a controller configured to set one of the plurality of gear change stages according to a running condition of the vehicle and configured to select one of a plurality of engagement combination states of the plurality of engagement mechanisms to achieve at least one gear change stage out of the plurality of gear change stages in a case in which the controller sets the at least one gear change stage, the at least one gear change stage having the plurality of engagement combination states to achieve the at least one gear change stage,
wherein the controller selects the one of the plurality of engagement combination states according to the vehicle speed detected by the vehicle speed detector, and wherein a condition of the vehicle speed for selecting one of the plurality of engagement combination states is defined such that an amount of work loss, which occurs in a friction member of one engagement mechanism out of the plurality of engagement mechanisms at the vehicle speed, is higher than or equal to a predetermined amount, the one engagement mechanism being released when another of the plurality of engagement combination states is selected.

8. The control apparatus for the automatic transmission according to claim 7,
wherein when the at least one gear change stage having the plurality of engagement combination states is initially set, the controller selects one of the plurality of engagement combination states, and subsequently, causes a shift from the one of the plurality of engagement combination states which is initially selected to another of the plurality of engagement combination states according to the vehicle speed.

9. The control apparatus for the automatic transmission according to claim 8,
wherein at least one of the plurality of engagement mechanisms is engaged with one of the rotational elements provided in one of the plurality of planetary gear mechanisms that performs no torque transmission in the engagement combination state which is initially selected.

10. The control apparatus for the automatic transmission according to claim 8,
wherein an engagement combination state selected at initial setting of the at least one gear change stage having the plurality of engagement combination states allows gear change from the at least one gear change stage to a gear change stage which is one gear stage or two gear stages away to a higher or lower gear by shifting engagement of one of the plurality of engagement mechanisms, which is engaged by the one of the plurality of engagement combination states, to another engagement of the plurality of engagement mechanisms.

11. The control apparatus for the automatic transmission according to claim 8,
wherein the another engagement combination state allows gear change to a gear change stage which is three gear stages away to a higher or lower gear by shifting engagement of one of the plurality of engagement mechanisms, the another engagement combination state being shifted from the one of the plurality of engagement combination states which is initially selected according to the vehicle speed when the at least one gear change stage having the plurality of engagement combination states is set.

12. The control apparatus for the automatic transmission according to claim 8,
wherein a first amount of work loss occurs in a friction member of one engagement mechanism out of the plurality of engagement mechanisms, and
wherein the first amount of work loss in the one of the plurality of engagement combination states is higher than a second amount of work loss in the another of the plurality of engagement combination states.

13. A control apparatus for an automatic transmission of a vehicle, the control apparatus comprising:
a vehicle speed detector configured to detect a vehicle speed;
a setting controller configured to set one of a plurality of gear change stages according to a running condition of the vehicle, the automatic transmission being configured to achieve the plurality of gear change stages with different transmission gear ratios, the plurality of engagement mechanisms each being configured to releasably connect two rotational elements of a plurality of planetary gear mechanisms or to releasably fix at least one of the rotational elements to a member on a fixed side, each of the plurality of planetary gear mechanisms including rotational elements having a sun gear, a carrier, and a ring gear; and a selecting controller configured to select one of a plurality of engagement combination states of the plurality of engagement mechanisms to achieve at least one gear change stage out of the plurality of gear change stages in a case in which the setting controller sets the at least one gear change stage, the at least one gear change stage having the plurality of engagement combination states to achieve the at least one gear change stage, wherein the selecting controller selects the one of the plurality of engagement combination states according to the vehicle speed detected by the vehicle speed detector, wherein the selecting controller has a transmission characteristic that defines an area of gear change stage for the vehicle speed, the gear change stage being settable by the automatic transmission, and a condition of the vehicle speed for selecting one of the plurality of engagement combination states is defined such that the vehicle speed allows a skip gear change from the at least one gear change stage having the plurality of engagement combination states to a gear change stage which is at least two gear stages away to a lower gear in the transmission characteristic.

* * * * *